W. WAKLEY.
SAW TOOL.
APPLICATION FILED NOV. 27, 1909.
976,956.
Patented Nov. 29, 1910.
2 SHEETS—SHEET 2.
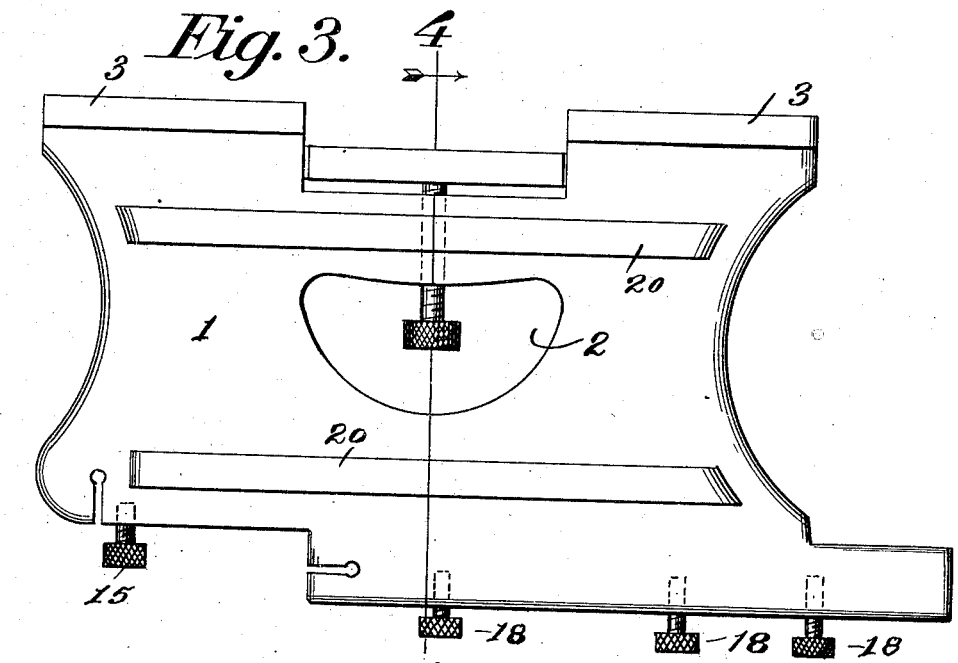
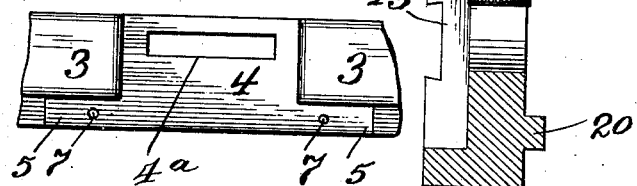
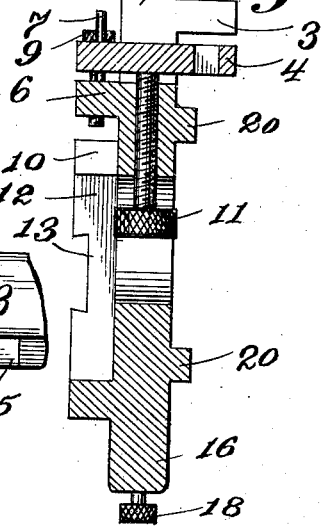
Witnesses
Horace N. Lybrand
James W. Koehl
Inventor
William Wakley
By Victor J. Evans
Attorney

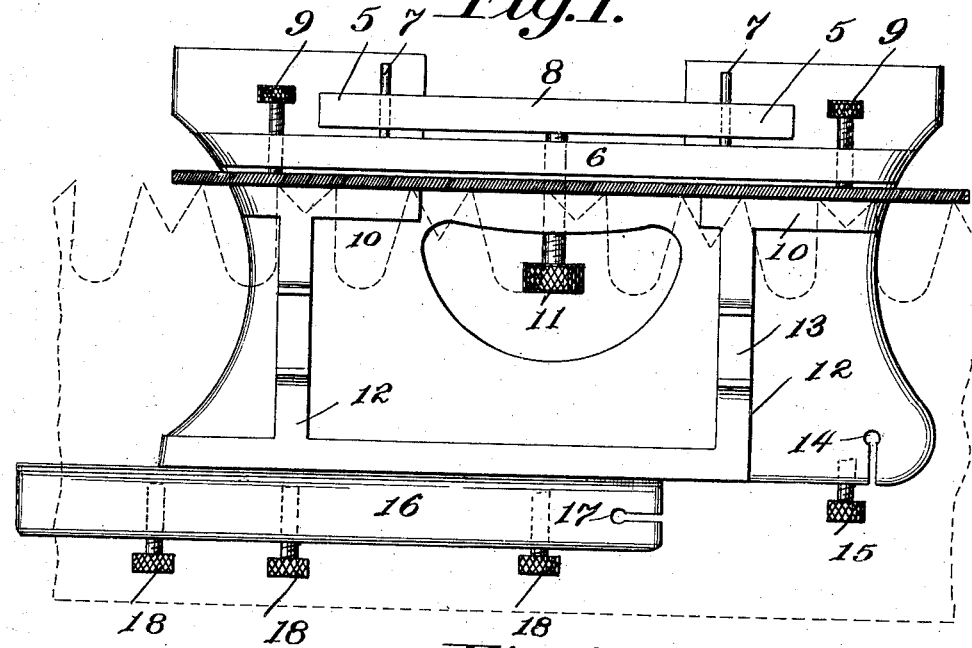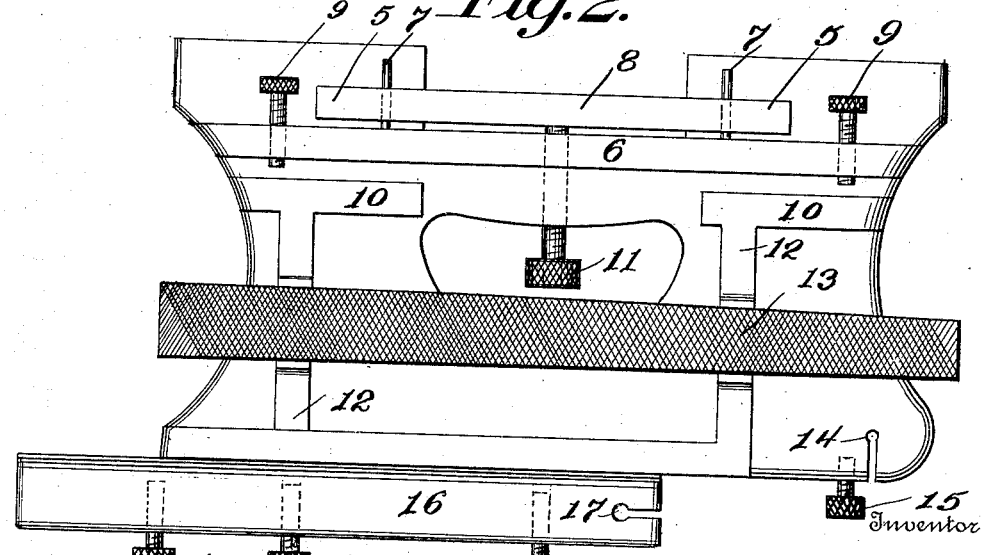

UNITED STATES PATENT OFFICE.

WILLIAM WAKLEY, OF INDIAN LAKE, NEW YORK.

SAW-TOOL.

976,956. Specification of Letters Patent. Patented Nov. 29, 1910.

Application filed November 27, 1909. Serial No. 530,176.

*To all whom it may concern:*

Be it known that I, WILLIAM WAKLEY, citizen of the United States, residing at Indian Lake, in the county of Hamilton and State of New York, have invented new and useful Improvements in Saw-Tools, of which the following is a specification.

This invention relates to saw tools for gaging and jointing the saw teeth etc., and an object of the invention is to provide a device of this class that will embody means whereby the drag or raker teeth of the saw can be readily ground to their proper sizes.

A still further object of the invention is to provide a device of the class described above wherein simple and novel means are employed for gaging and setting the drag teeth.

Other objects and advantages will be apparent as the nature of the invention is better disclosed and it will of course be understood that changes within the specified scope of the claims can be made without departing from the spirit of the invention.

In the drawings, forming a portion of this specification and in which like numerals of reference indicate similar parts in the several views:—Figure 1 is a side elevation of my improved tool. Fig. 2 is a similar view showing the tool in use with a finishing file. Fig. 3 is a view similar to Fig. 1 looking at the device from the reverse side. Fig. 4 is a detail section taken on the line 4—4 of Fig. 3. Fig. 5 is a detail top plan view of the tool.

My improved tool or device comprises a stock 1 which is provided with a centrally located passage. Upon the upper edge, the stock 1 is provided with a pair of spaced right angularly extending abutment plates 3, and immediately between these plates is disposed a gage member 4. This gage member is provided with a pair of oppositely extending wings or flanges 5, which are movable with the gage member and are adapted to facilitate its perfect adjustment. The stock 1 is provided with a horizontally disposed rib 6 from which arises a pair of spaced pins 7. These pins are disposed in guide passages 8 which are formed in the wings 5 of the gage member. Outwardly of the ends of the wings 5, the rib 6 carries set screws 9 which are adjustable toward or away from spaced ribs 10. The construction just described is such that a flat file may be placed between the ribs 6 and 10 respectively and securely held in its operative position by the screws 9. The file when thus held in the position named may be effectively used for the purpose of jointing the saw as will be understood. The stock 1 carries an adjusting screw 11 which is engaged with the gage plate so that the latter can be adjusted vertically. The gage plate has formed therein an elongated raker tooth receiving slot, 4ª.

The stock 1 carries a pair of spaced members 12 which are provided with alining recesses 13 which are adapted to receive a smoothing or finishing file.

The stock 1 is provided with a set groove 14 and adjacent to the said groove, the said stock is provided with an adjustable gage screw 15. In operation, after the teeth have been properly sharpened, they may be independently operatively positioned in the set groove 14 and by striking the body portion of the saw and moving it toward said screw 15 the teeth can be accurately bent.

A member 16 is formed upon one of the longitudinal edges of the stock 1 and as illustrated this member is provided at one end with the punch set groove 17. The member 16 carries a plurality of gage screws 18 which are adapted to be operated whereby it can be readily determined whether or not the teeth of the saw have been properly set.

The tool herein described and shown is extremely simple in construction and embodies effective and accurate means whereby the jointing and setting operation of a saw can be greatly facilitated.

If desired the teeth of the saw can be independently inserted in the groove 14 and the stock 1 may be grasped by the hand of the operator and used as a lever. The member 16 is extended beyond one end of the stock and serves as a support for the hand of the operator when the stock is used in the manner just mentioned. The stock 1 is provided at one side with spaced longitudinally extending strips 20 against which the blade or body portion of the saw may be placed so that the teeth of the saw can be correctly positioned in the slot formed in the gage member.

I claim:—

A saw tool of the character specified comprising a stock having spaced abutment plates along one of its longitudinal edges, a gage member movable between the said plates and formed to provide a raker tooth-receiving opening, oppositely extending wings formed on the said gage member and slidable against one side of the said stock and formed to provide vertical apertures, a longitudinally extending rib on one side of the stock and located immediately beneath the wings of the said gage member, pins supported by the said rib and extending through the apertures of the wings of the said gage member, a plurality of fixed ribs located beneath the first named rib, set screws on the first named rib and adjustable toward or away from the said plurality of ribs, and a set screw operatively connected with the said gage member.

In testimony whereof I affix my signature in presence of two witnesses.

WILLIAM WAKLEY.

Witnesses:
GEORGE H. TRIPP,
GEO. RICHARDSON.